United States Patent
Cheong et al.

(10) Patent No.: US 9,667,870 B2
(45) Date of Patent: May 30, 2017

(54) METHOD FOR CONTROLLING CAMERA OPERATION BASED ON HAPTIC FUNCTION AND TERMINAL SUPPORTING THE SAME

(71) Applicant: Samsung Electronics Co., Ltd., Gyeonggi-do (KR)

(72) Inventors: Cheolho Cheong, Seoul (KR); Dongjin Koh, Seoul (KR)

(73) Assignee: Samsung Electronics Co., Ltd (KR)

( * ) Notice: Subject to any disclaimer, the term of this patent is extended or adjusted under 35 U.S.C. 154(b) by 135 days.

(21) Appl. No.: 14/149,433

(22) Filed: Jan. 7, 2014

(65) Prior Publication Data

US 2014/0192247 A1    Jul. 10, 2014

(30) Foreign Application Priority Data

Jan. 7, 2013    (KR) .................. 10-2013-0001415

(51) Int. Cl.
  *H04N 5/232*    (2006.01)
  *G03B 37/02*    (2006.01)
  *G06F 3/01*    (2006.01)
  *H04N 5/77*    (2006.01)

(52) U.S. Cl.
  CPC ......... *H04N 5/23293* (2013.01); *G06F 3/011* (2013.01); *G06F 3/016* (2013.01); *H04N 5/23222* (2013.01); *H04N 5/23238* (2013.01); *G03B 37/02* (2013.01); *H04N 5/772* (2013.01)

(58) Field of Classification Search
  CPC . H04N 5/23293; H04N 5/23222; G06F 3/016
  USPC .......................... 348/333.11, 222.1, 362, 169
  See application file for complete search history.

(56) References Cited

U.S. PATENT DOCUMENTS

| | | | |
|---|---|---|---|
| 7,602,278 | B2 | 10/2009 | Prost-Fin et al. |
| 2003/0222977 | A1 | 12/2003 | Yoshino |
| 2006/0284834 | A1 | 12/2006 | Itkowitz et al. |
| 2007/0253698 | A1 | 11/2007 | Park et al. |
| 2008/0018748 | A1 | 1/2008 | Niemi et al. |
| 2008/0296072 | A1 | 12/2008 | Takashima et al. |
| 2009/0063118 | A1 | 3/2009 | Dachille et al. |
| 2010/0066810 | A1 | 3/2010 | Ryu et al. |
| 2011/0008036 | A1 | 1/2011 | Takatsuka et al. |

(Continued)

FOREIGN PATENT DOCUMENTS

| | | |
|---|---|---|
| EP | 2 164 244 | 3/2010 |
| EP | 2 285 095 | 2/2011 |

(Continued)

OTHER PUBLICATIONS

European Search Report dated Jan. 5, 2017 issued in counterpart application No. 14150365.6-1903, 17 pages.

*Primary Examiner* — Mekonnen Dagnew
(74) *Attorney, Agent, or Firm* — The Farrell Law Firm, P.C.

(57) ABSTRACT

A method for providing camera operations using a haptic function, and an electronic device implementing the same are provided. The method of operating the electric device includes receiving, by an electronic device including a camera, an input to activate the camera; receiving a request to output guidance information for assisting with photographing with the camera; determining haptic feedback corresponding to the guidance information; and outputting the determined haptic feedback.

25 Claims, 6 Drawing Sheets

(56) References Cited

U.S. PATENT DOCUMENTS

| | | | |
|---|---|---|---|
| 2011/0012989 A1 | 1/2011 | Tseng et al. | |
| 2011/0032371 A1 | 2/2011 | Teramoto | |
| 2011/0216179 A1* | 9/2011 | Dialameh | G06F 17/30247 348/62 |
| 2011/0275409 A1* | 11/2011 | Lee | G06F 1/1643 455/556.1 |
| 2012/0050324 A1* | 3/2012 | Jeong | G06F 17/30 345/633 |
| 2012/0105579 A1 | 5/2012 | Jeon et al. | |
| 2012/0141949 A1* | 6/2012 | Bodony | A61C 9/0053 433/29 |
| 2014/0104453 A1* | 4/2014 | Fujinawa | H04N 5/23219 348/222.1 |
| 2015/0143459 A1* | 5/2015 | Molnar | G06F 21/629 726/2 |

FOREIGN PATENT DOCUMENTS

| | | |
|---|---|---|
| JP | 2011-19051 | 1/2011 |
| KR | 1020070105108 | 10/2007 |
| WO | WO 2008/010762 | 1/2008 |
| WO | WO 2012/176441 | 12/2012 |

\* cited by examiner

METHOD FOR CONTROLLING CAMERA OPERATION BASED ON HAPTIC FUNCTION AND TERMINAL SUPPORTING THE SAME

CROSS REFERENCE TO RELATED APPLICATIONS

This application claims priority under 35 U.S.C. §119(a) to a Korean patent application filed on Jan. 7, 2013 in the Korean Intellectual Property Office and assigned Ser. No. 10-2013-0001415, the entire disclosure of which is incorporated herein by reference.

TECHNICAL FIELD

The present disclosure generally relates to an electronic device including a camera, and more particularly, to a method for providing camera operations using a haptic function, and an electronic device implementing the same.

BACKGROUND

Recently, various electronic devices, such as digital cameras, mobile phones, tablet Personal Computers (PCs), electronic dictionaries, and Personal Digital Assistants (PDAs), have come equipped with image photography functions. These devices or terminals often provide users with photography features beyond just simple image and video photography. Many of these terminals support advanced features such as panorama image and action shot photography.

The panorama image photography function creates a panorama photo from multiple photos taken by the user, using a camera device in a manual or automatic operation, where the image in one picture partially overlaps that in another.

The action shot photography function takes multiple, successive photos by tracing a moving object and generating an image by combining each of the successive photos into a single image.

SUMMARY

The above-described panorama image photography function obtains a plurality of images and synthesizes those images to a single image by using a "panorama image synthesizing" method. However, this method creates the problem of image distortion because images are synthesized by using the pixel information of adjacent images without any additional information. By adding various calculations or by displaying a portion of the photographed image in a view finder or display unit of the camera or portable terminal so that a newly photographed image is overlapped on the previously photographed image, this distortion can be reduced. However, because the camera operation is made using information displayed in the terminal's display unit, this method may result in additional difficulties related to the display unit; particularly, when photographing in an environment where bright lighting or surroundings reflect heavily on the display. Because this difficulty applies to action shot photography as well, a user frequently performing outdoor photography encounters problems in obtaining desirable panorama photos or action shots due to the challenges that the outdoor environment often presents.

The present disclosure provides a method for supporting a haptic-based camera operation and a terminal supporting the same, which minimizes the challenges of photographing in an outdoor environment and offers proper guidance information by providing such information with haptic feedback when necessary to adjust a location, angle, height, distance, or focus through the camera control in during photographing.

Further, the present disclosure provides a method for supporting a haptic-based camera operation and a terminal supporting the same, which enables ease of camera operation with an intuitive and simple haptic feedback by detecting context information such as a distance to camera, angle, movement, finger position, and grip in an image tracing, panorama image photography, action shot photography, face recognition, image barcode and card recognition, and specific angle photography, and by controlling a plurality of haptic devices with a predefined intensity and pattern according to the corresponding situation.

According to an aspect of the present disclosure, a method for operating an electric device is provided, which includes receiving, by an electronic device including a camera, an input to activate the camera; receiving a request to output guidance information for assisting with photographing with the camera; determining haptic feedback corresponding to the guidance information; and outputting the determined haptic feedback.

According to another aspect of the present disclosure, an electronic device is provided, which includes a camera configured to obtain an image; a processor configured to determine haptic feedback corresponding to guidance information for assisting with photographing with the camera, if an output of the guidance information is requested; and a haptic device module configured to output the determined haptic feedback.

According to another aspect of the present disclosure, a method of operating an electronic device is provided, which includes receiving, by an electronic device including a camera and one or more haptic devices, an input to activate the camera; determining, by the electronic device, one or more of a desired position, orientation, or movement of the electronic device for an operation of the camera; and activating, by the electronic device, at least one of the one or more haptic devices, based on the determined one or more of the desired position, orientation, or movement.

According to another aspect of the present disclosure, an electronic device is provided, which includes a camera; a processor configured to receive an input to activate the camera, and to determine one or more of a desired position, orientation, or movement of the electronic device for an operation of the camera; and one or more haptic devices. The processor is further configured to activate at least one of the one or more haptic devices, based on the determined one or more of the desired position, orientation, or movement.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

The present disclosure will be described more fully hereinafter with reference to the accompanying drawings, in which various illustrative embodiments of the disclosure are shown. This disclosure may, however, be embodied in many different forms and should not be construed as limited to the embodiments set forth herein. Rather, these embodiments are provided so that the description of this disclosure will be thorough and complete, and will fully convey the scope of the disclosure to those skilled in the art. The present disclosure will be defined by the appended claims.

The same or similar reference symbols are used throughout the drawings to refer to the same or like parts or components. Detailed descriptions of well-known functions and structures incorporated herein may be omitted to avoid obscuring the subject matter of the disclosure. For the same reasons, some components in the accompanying drawings are emphasized, omitted, or schematically illustrated, and the size of each component may not fully reflect its actual size. Accordingly, the present disclosure is not limited to the relative sizes and distances illustrated in the accompanying drawings.

Although ordinal numbers such as "first", "second", "third", etc. may be used to describe various elements, components, regions, layers and/or sections, these elements, components, regions, layers and/or sections should not be limited by those terms. These terms are merely used to distinguish one element, component, region, layer or section from another. Thus, a first element, component, region, layer or section discussed below could be termed a second element, component, region, layer or section without departing from the teachings of the inventive concept. Descriptions shall be understood as to include any and all combinations of one or more of the associated listed items when the items are described by using the conjunctive term "and/or" or the like.

It is to be understood that the singular forms "a", "an" and "the", include plural references unless the context clearly dictates otherwise. It will be further understood that the terms, unless the context clearly dictates otherwise, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
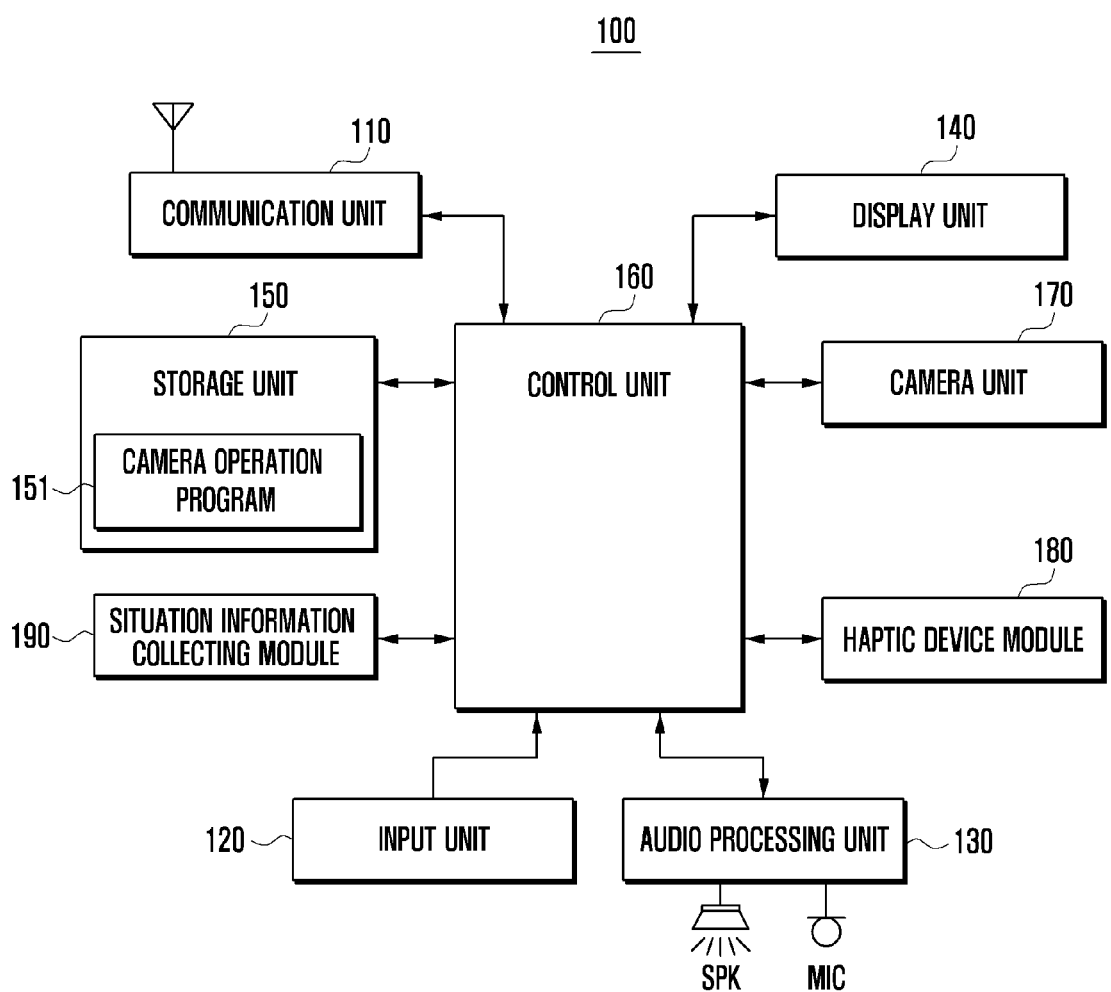
FIG. 1 is a block diagram illustrating a configuration of a terminal supporting a camera operation based on a haptic function according to an embodiment of the present disclosure.

FIG. 1 is a block diagram illustrating a configuration of a terminal supporting a camera operation based on a haptic function according to one embodiment of the present disclosure. In this document, the term "terminal" can be interchangeably used with other terms, such as "electronic device," "apparatus," "portable device," "portable electronic device," or "imaging device."

Referring to FIG. 1, a terminal 100 may include a communication unit 110, input unit 120, audio processing unit 130, display unit 140, storage unit 150 including a camera operation program 151, camera unit 170, haptic device module 180, context information collecting module 190, and control unit 160.

The terminal 100 can support a user in performing image photographing according to haptic-based guidance information. Through the haptic device module 180, the haptic-based guidance may provide diversified information related to the operation of camera unit 170. In particular, the terminal 100 may support controlling the operation of camera unit 170 more properly by providing various types of haptic-based guidance information according to the type of haptic device module 180.

The communication unit 110 may be an additional component installed in the terminal 100 and provides a communication function. Communication unit 110 may be omitted if the terminal 100 does not support the communication function. The communication unit 110 may be configured with a mobile communication module forming a communication channel with a base station used to support the communication function of the terminal. The communication unit 110 may receive information from the outside according to predetermined schedule information or a user control, and transmit the information stored in the terminal 100 or collected by the terminal 100 to the outside. Further, the communication unit 110 may be configured with a communication module which supports local area network communications, and which forms a network channel with other terminals for the purpose of transmitting stored images. For example, the communication unit 110 may transmit various image data collected by the camera unit 170, such as a panorama image and action shot image, to another terminal or specific server according to a user control. Further, the communication unit 110 may receive a panorama image or action shot image from other terminals, and output to the display unit 140 or store in the store storage unit 150 according to the control of control unit 160.

The input unit 120 may generate various input signals for the operation of terminal 100. The input unit 120 may be configured with various input means such as a keyboard, keypad, or key button according to its compatibility with the terminal 100. Further, the input unit 120 may be configured in a touch map form outputting to a touch screen if the display unit 140 is installed with a touch screen. For example, the input unit 120 may generate a shutter button input signal for control of camera operation and a key input signal for camera settings. The key input signal may be generated by a hardware key disposed in the front or side of the terminal 100, or by a user's selection from a virtual touchpad output through the display unit 140 if the display unit is provided in a touch screen form. The input unit 120 may generate an input signal for selecting a haptic-based guidance mode according to an embodiment of the present disclosure. Accordingly, the terminal 100 does not provide haptic feedback if the corresponding mode is not selected, but does provide haptic feedback if the haptic-based guidance mode is selected.

The audio processing unit 130 may include a speaker SPK for outputting audio data. Audio processing unit 130 may output audio data for the operation of terminal 100, audio data stored in the storage unit 150, and audio data received from the outside. Additionally, the audio processing unit 130 may include a microphone MIC for collecting audio data. The audio data output by the audio processing unit 130 may include various guide and effect sounds related to the control of the camera. For example, the audio processing unit 130 may output audio data corresponding to a haptic feedback if such feedback is to be output in the process of providing haptic-based guidance information. Here, the audio data corresponding to the haptic feedback may be guide or effect sounds predefined according to the pattern of each of the various haptic feedback outputs. Accordingly, a user will be able to more aptly control the camera unit 170 by receiving the haptic-based guidance information in a tactile form and simultaneously listening to the associated audio data.

Alternatively, an output function of audio data corresponding to the camera guidance information of the audio processing unit 130 may be disabled according to a user setting.

The display unit 140 may output various screens for the operation of terminal 100. For example, the display unit 140 may support a waiting screen and menu screen for the operation of terminal 100. The display unit 140 may output various screens such as a screen related to the control of the camera screen, a camera operation screen, a camera setting screen, an image preview screen, a stored image view screen, a synthesized image search screen, and a screen providing user interface information for improving the usability of terminal.

The display unit 140 may provide a screen for selecting a haptic-based guidance mode. Further, the display unit 140 may provide various screens related to the haptic-based guidance information. Accordingly, the display unit 140 can assist in providing improved operational experience of the camera unit 170 by offering the user both haptic-based guidance information and supplementary information related to the operation of camera unit 170.

Additionally, when photographing a panorama image or an action shot image, the display unit 140 can display a preview image with the panorama image or the action shot image to be synthesized. Accordingly, the display unit 140 may support the user in identifying the progress of synthesizing the panorama or action shot image while the user is photographing in real time. The display unit 140 may also support the user in to identifying information related to the subject to be photographed.

Additionally, the display unit 140 may provide a screen for controlling settings related to the operation of haptic device module 180. The setting screen related to the haptic device module 180 may be a screen for controlling the setting of a direction or dimension of haptic feedback to be provided to the user with guidance information. The terminal 100 may perform haptic settings desired by the user through a corresponding setting screen, and thereby the user can identify the haptic-based guidance information more easily and correctly.

The storage unit 150 may store a basic operating system for the operation of terminal 100, an application program and associated algorithms, data corresponding to various user functions, preview images, photographed original images, synthesized images, such as action shots and panorama images, context information, etc. Additionally, the storage unit 150 may store a camera operation program 151 for supporting camera control functions according to the present disclosure.

The camera operation program 151 may include various routines for a camera operation of the terminal 100. For example, the camera operation program 151 of camera unit 170 may include a routine for activating the camera unit 170 according to a turn-on input signal, a routine for outputting a preview image, a routine for outputting data collected and transmitted by the activated camera unit 170, and a routine for synthesizing and storing the data transmitted by the camera unit 170 in forms of panorama image and action shot image according to a predetermined mode such as a panorama image photography mode and action shot image photography mode. The camera operation program 151 may include a routine for providing a haptic function according to the present disclosure.

The routine for providing a haptic function may identify whether the currently set mode of the camera unit 170 is a panorama image photography mode or action shot image photography mode. According to the identified mode, this haptic function routine may include a sub-routine for collecting context information, a sub-routine for generating guidance information based on the collected context information, a sub-routine for generating haptic operation information for the operation of haptic device module 180 based on the generated guidance information, and the sub-routine for providing the haptic device module 180 with the generated haptic operation information. The sub-routine for collecting context information may activate at least one of any number of sensors included in the context information collecting module 190, and may analyze the context information according to a sensor signal collected by the sensor.

The context information may include an image trace, a panorama image photography mode, an action shot photography mode, a face recognition mode, and an image barcode recognition mode. The context information may also include information measuring the distance to camera, angle, movement, finger position, and grip position in a specific angle photography mode. Further, the context information may include at least one of camera location information, camera state, angle, direction angle, rotation, camera drive state, camera movement detection, object movement detection, GPS, terrestrial magnetism, gyro compass, acceleration, angular velocity, horizontality detection, contact detection, enlargement ratio, focusing information, motion recognition, or distance to objet. Application examples of the context information will be explained in reference to the accompanying drawings.

The camera unit 170 is a component collecting a still image or moving image. The camera unit 170 may include components for supporting camera functions such as a lens, aperture, aperture drive, and lens controller, and may include an image sensor and an image data processor. For example, the camera unit 170 may provide a photography mode for a panorama image or action shot image.

The haptic device module 180 is a component that may provide a user with specific haptic feedback through the terminal 100 by operating according to a haptic pattern corresponding to guidance information under the control of control unit 160. For this, the haptic device module 180 may include at least one haptic device generating vibrations. The haptic device may be provided in various forms according to a designer's intention. For example, the haptic device module 180 may include a haptic actuator configured with a vibrator. Further, the haptic device module 180 may include four (4) haptic devices individually having a vibrator, which may be disposed at specific areas of edges in the terminal 100.

The haptic device module 180 may include haptic devices configured in a cell type having a specific size. The haptic devices configured in a cell type may be disposed in any area of the terminal 100 including the front surface of the display unit 140. For example, the haptic devices configured in a cell type may be individually paired with a contact sensor having a specific size and a vibrator sensor supporting a haptic function. Further, the haptic device module 180 may be configured in a matrix form with a plurality of cells in which the contact sensors having a specific thickness and width are disposed at the upper side and the vibrator sensors are disposed at the lower side.

By disposing the haptic devices at various areas of the display unit 140, a contact sensor signal can be collected according to an area gripped by the user of the terminal 100, and thereby the user's gripping area of the terminal 100 is identified based on the collected contact sensor signal. Therefore, the haptic device module 180 can control the activation of the cell type haptic devices located in the user's gripping area or those haptic devices having a specific distance from the user's gripping area. Further, the haptic device module 180 may support haptic feedback based on the haptic devices from which a contact sensor signal is generated when outputting guidance information related to the operation of camera unit 170.

To support the above function, if the camera unit 170 is activated and enters a panorama image photography mode or action shot image photography mode, the haptic device module 180 may supply power to collect contact sensor signals according to the user's gripping state and based on the cell type haptic devices provided in the terminal 100. The haptic device module 180 may then process the signal. The haptic device module 180 may repeat the collection of contact sensor signal and identification of user's gripping state in a predetermined period. The haptic device module 180 may be deactivated by cutting off the power supply, deactivating the camera unit 170, or terminating the panorama image or action shot image photography mode.

The context information collecting module 190 may include a plurality of sensors being activated under the control of control unit 160 for activation of the camera unit 170, and especially for panorama image photography mode or action shot image photography mode. The context information collecting module 190 may collect various sensor signals related to the situation of terminal 100 and transmits the signal to the control unit 160. For this, the context information collecting module 190 may include various sensors such as an accelerometer, geomagnetic sensor, gyro sensor, location information collecting sensor, luminance sensor, proximity sensor, temperature sensor, or air pressure sensor. Accordingly, various sensor signals can be collected and transmitted to the control unit 160 through at least one of the above sensors.

The control unit 160 is a component supporting a signal control, data processing, and data storage for the operation of the terminal 100. For example, the control unit 160 may be embodied as a hardware processor device or multiple hardware processor devices.

For the operation of the camera unit 170, the control unit 160 may support functions of outputting haptic-based guidance information, controlling various components and power supply, and collecting and analyzing signals. For this, the control unit 160 may include components illustrated in FIG. 2.

Figure 2:
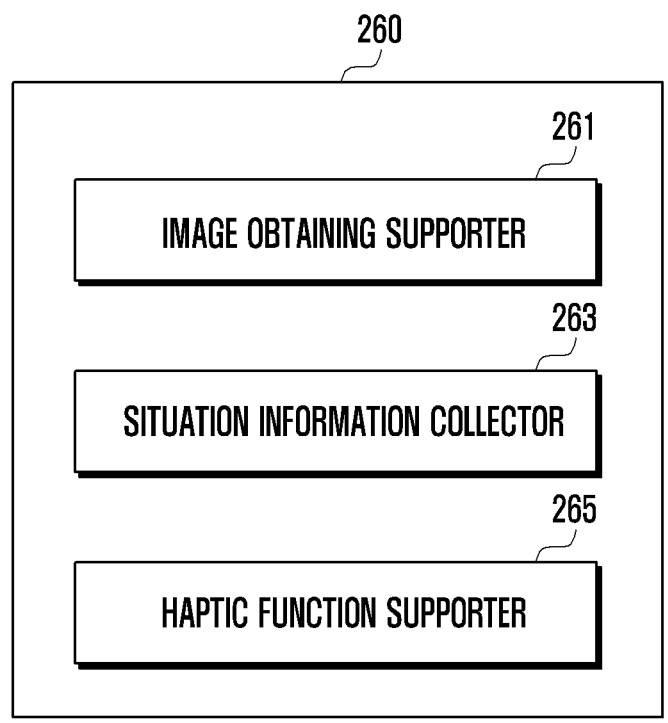
FIG. 2 is a block diagram illustrating a detailed configuration of a control unit according to an embodiment of the present disclosure.

FIG. 2 is a block diagram illustrating a detailed configuration of a control unit according to an embodiment of the present disclosure. The control unit 260 is an example of the control unit 160, as illustrated in FIG. 1.

Referring to FIG. 2, the control unit 260 may include an image obtaining supporter 261, context information collector 263, and haptic function supporter 265. The image obtaining supporter 261 may obtain an image of the camera unit 170. The image obtaining supporter 261 may supply a power to the camera unit 170 if an input signal requesting activation of the camera unit 170 is generated through the input unit 120 or display unit 140 having an input function. Further, the image obtaining supporter 261 may support a photography mode selected by the user. For example, the image obtaining supporter 261 may adjust a luminance or aperture according to user settings. The image obtaining supporter 261 may identify whether a panorama image photography mode or action shot image photography mode is set, and may perform the corresponding photography function.

The image obtaining supporter 261 may output guidance information for panorama image photography if the panorama image photography mode is set. Here, the image obtaining supporter 261 may output corresponding guidance information through the display unit 140 according to user settings, and may transmit that information to the haptic function supporter 265 according to the user settings or situation of the terminal 100. For example, if the illumination of the surrounding is greater than a predetermined value, the image obtaining supporter 261 may transmit the guidance information to the haptic function supporter 265 so that the guidance information is provided in haptic feedback form.

Additionally, the image obtaining supporter 261 may identify boundary points of images collected in the panorama image photography mode, and generate a panorama image by connecting the boundary points. The generated panorama image may be displayed through the display unit 140 or stored in the storage unit 150 according to a user's selection.

In the action shot photography mode, the image obtaining supporter 261 may generate an action shot image by rearranging photographed images based on an action object selected by the user. The generated action shot image may be displayed through the display unit 140 or stored in the storage unit 150 according to a user's selection.

The context information collector 263 may collect various sensor signals related to the situation of the terminal 100. The context information collector 263 may activate predetermined sensors if the camera unit 170 is activated and a panorama image photography mode or action shot photography mode is set. For example, the context information collector 263 may collect movement direction information of terminal 100 by activating an acceleration sensor.

Further, the context information collector 263 may collect one or more of location information of camera unit 170, hardware state information of camera unit 170, photography service state information, movement information of camera unit 170, object movement detection information, location information of terminal 100, geomagnetic information, gyro compass information, horizontality detection information, or contact detection information. The collected information may be provided for the haptic function supporter 265.

The haptic function supporter 265 may determine the appropriate haptic feedback according to guidance information and applying to the haptic device module 180 if the guidance information is received from the image obtaining supporter 261. For example, the haptic function supporter 265 can decide to design haptic feedback corresponding to the type of guidance information received from the image obtaining supporter 261 and context information received from the context information collector 263.

Further, the haptic function supporter 265 may support a haptic operation corresponding to the decided haptic feedback by applying to the haptic device module 180. For example, the haptic function supporter 265 may receive information regarding an output of a guide frame for panorama image photography from the image obtaining supporter 261, and may determine a haptic feedback for moving a corresponding guide frame to the right if the movement information for moving the terminal 100 to the right is received from the context information collector 263. Here, the haptic feedback for moving the terminal 100 to the right may be designed in a vibration form. Examples of the haptic feedback will be explained in more detail as referencing the accompanying drawings.

Figure 3:
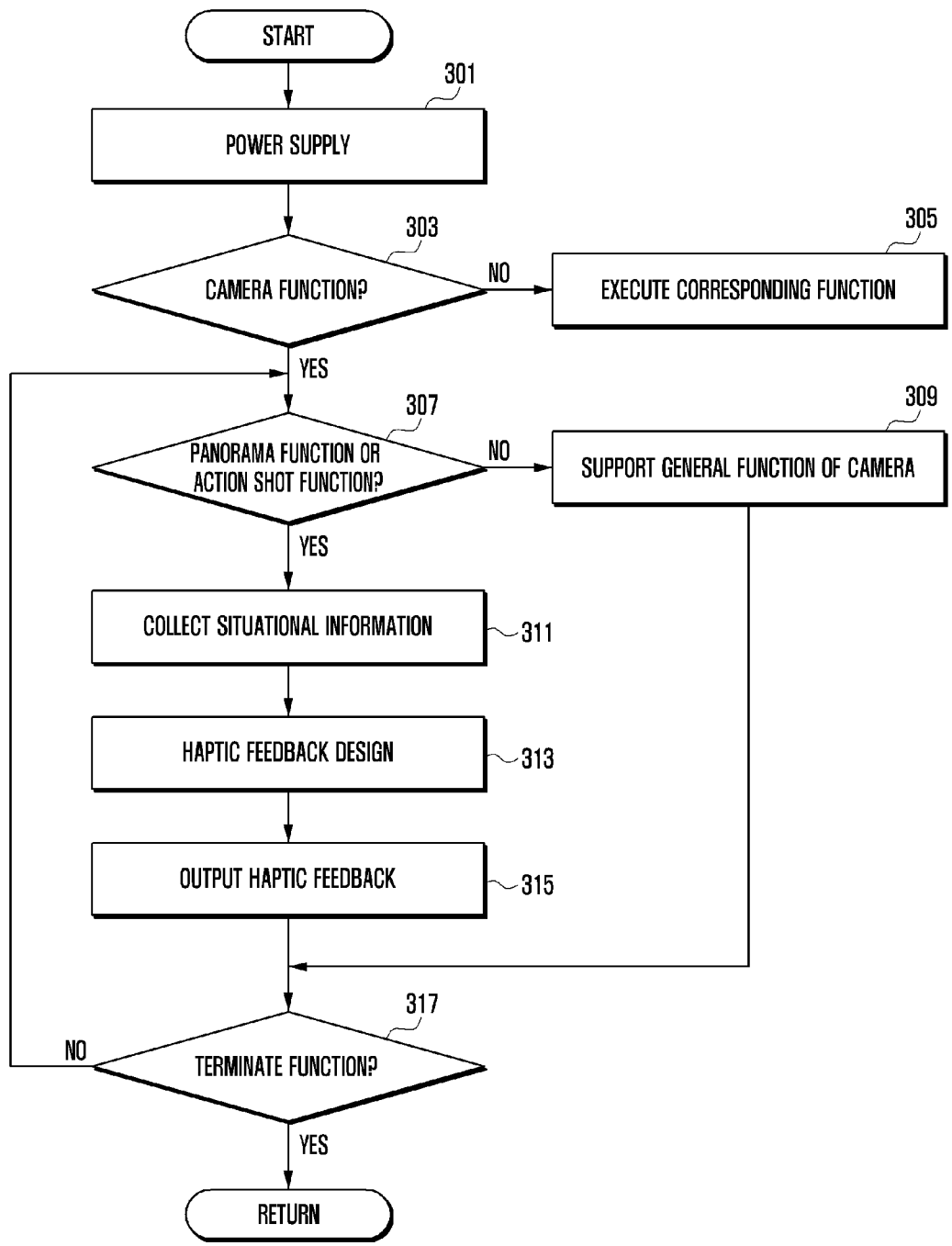
FIG. 3 is a flow chart illustrates a method of supporting a camera function based on a haptic function according to an embodiment of the present disclosure.

FIG. 3 is a flow chart illustrating a procedure of supporting a camera function based on a haptic function according to an embodiment of the present disclosure.

Referring to FIG. 3, at operation 301, a method for controlling a camera operation based on a haptic function according to the present disclosure first supplies an electric power from a power supply to each component of the terminal 100 under the control of control unit 160. At operation 303, the control unit 160 identifies whether an input event is generated for activating a camera function. If the generated event is not for activating a camera function, at operation 305, the control unit 160 performs a function according to the input event. For example, the control unit 160 can perform a file play function, file editing function, or communication function according to the input event. Here, if an input signal for terminating the operation of terminal 100 is generated, the control unit 160 terminates the operation of terminal 100 by cutting off the power supply to the terminal 100.

If an input event for activating the camera function is generated at operation 303, the control unit 160 identifies whether a panorama image photography mode or action shot image photography mode is set at operation 307. If the set mode or mode requested by the user is not the panorama image photography mode or action shot image photography mode, at operation 309, the control unit 160 performs a general camera function. For example, the control unit 160 can support a still image photography function and moving image photography function, and identify an image collected through the camera unit 170.

At operation 307, if the set mode is a panorama image photography mode or action shot image photography mode, the control unit 160 collects context information at operation 311. For example, the control unit 160 may supply electric power to at least one of the aforementioned various sensors, and may collect various sensor signals according to the location or movement of terminal 100, or movement of the subject.

At operation 313, if the context information is collected, the control unit 160 may decide to output a haptic feedback corresponding to the context informational. For example, the control unit 160 may identify predefined guidance information according to the panorama image photography mode or action shot image photography mode, and select guidance information corresponding to the current situation of terminal 100 from the predefined guidance information, and determine on corresponding haptic feedback.

At operation 315, the control unit 160 outputs the corresponding haptic feedback. For example, the control unit 160 may provide a designed haptic feedback for the haptic device module 180. The control unit 160 may continue to collect the context information, and identify whether the situation of terminal 100 changes according to the guidance information.

Further, the control unit 160 may change the design of haptic feedback according to the continuously collected context information, and provide the changed haptic feedback information for the haptic device module 180. The haptic device module 180 may change at least one of direction, amplitude, or period of haptic feedback according to the information transmitted by the control unit 160 so that a specific haptic feedback is performed according to the control of control unit 160.

While performing the haptic feedback according to the context information, the control unit 160 may control to stop the haptic feedback if a photography function of the camera unit 170 is activated. Namely, the control unit 160 does not perform the haptic feedback while photographing an image to avoid an influence of shaking For example, the control unit 160 stops the haptic feedback if the terminal 100 supports a half shutter function and an input event for performing the half shutter function is generated.

Further, the control unit 160 may stop the haptic feedback if the terminal 100 finally moves in the direction or to the location requested by the guidance information of haptic feedback. For example, the haptic feedback may be stopped while the camera unit 170 is moving in a requested focusing direction in a situation that a focus movement is performed for the panorama image photographing.

At operation 317, the control unit 160 identifies whether an input signal for terminating the camera function is generated. If an input signal for terminating the camera function is not generated, the procedure goes back to step 307 and the subsequent operations are repeated. If the input signal for terminating the camera function is generated at operation 317, the procedure returns to operation 301 and all subsequent operations are repeated.

As described above, the embodiment of the present disclosure may provide guidance information in haptic feedback form for the operation of camera unit 170 if an output of predetermined guidance information is requested. Accordingly, a user can obtain a desired image in various situations, because the user can operate the camera unit 170 based on a tactile sensation detected from the portion of the body gripping the terminal 100.

The haptic feedback function can be used in various situations besides the panorama image photography or action shot image photography. For example, when performing a face recognition function, the terminal 100 according to the present disclosure provides guidance information improving face recognition. Guidance is provided for adjusting a distance to face measurement or zooming in/out in a haptic feedback form, when the size of the face in a collected subject is greater or smaller than a predetermined size.

An additional application is for barcode, such as Quick Response (QR) codes, or card recognition. Here, the terminal 100 may provide guidance information for maintaining a proper distance to subject (i.e. the barcode) in a haptic feedback form if the distance to the subject is greater or smaller than the distance for correct recognition of the subject. Besides the adjustment of distance to the subject, the control unit 160 may provide guidance information for focus adjustment in a haptic feedback form to adjust a focus if the subject is not correctly focused.

For example, the control unit 160 may extract context information, such as a distance and angle between a predefined reserved image area and the current preview image by analyzing a preview image photographed by the camera unit 170, and calculate at least one of a proper intensity, a pattern, or a direction of the haptic feedback so that the current preview image is located in the reserved image area. Here, the reserved image area may have a predetermined size for proper recognition of the barcode or card.

Additionally, the terminal 100 may support outputting a menu or icon through the display unit 140 in order to select one from a panorama image photography mode, action shot image photography mode, face recognition mode, image-based barcode recognition mode, or card recognition mode. The terminal 100 may be provided with an input unit or display unit having an input function to generate an input signal for selecting the above modes. For example, a user can activate one of the above modes by pressing a specific button or key, and the terminal 100 may support this function by mapping one of the above modes to a specific button or key.

The guidance information providing functions related to the camera unit 170 may be similarly applied to an augmented reality or virtual reality. For example, in order to match the current image photographed by the camera unit 170 with an image of augmented reality provided by a server, guidance information for adjusting the current zooming state of image and direction of camera unit 170 may be provided in a haptic feedback form.

Figure 4:
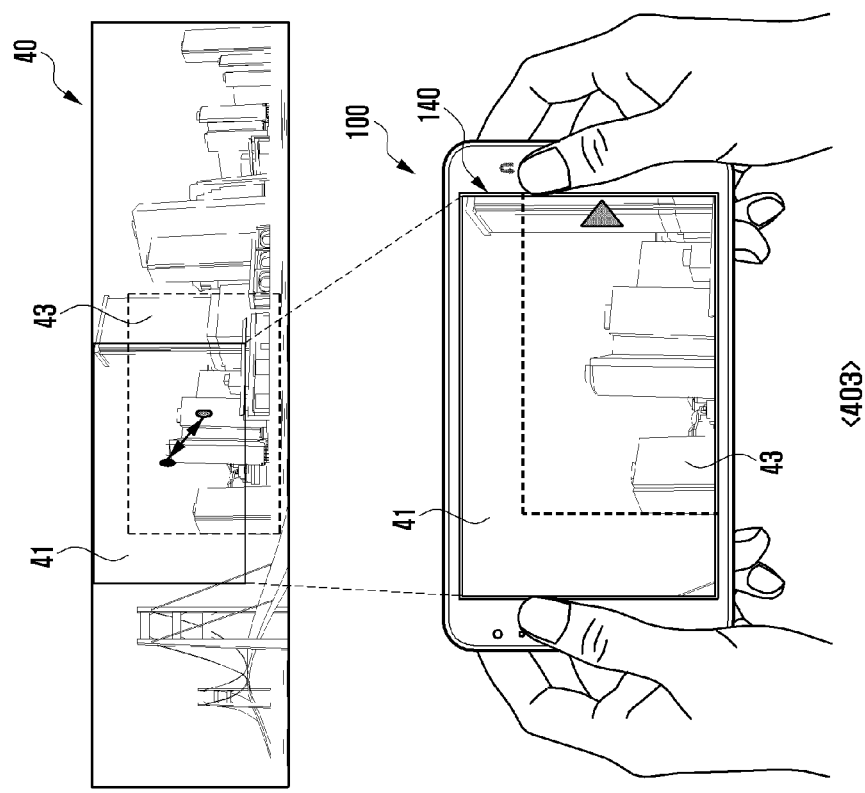
FIG. 4 illustrates an example of panorama image photographing in supporting a camera operation according to an embodiment of the present disclosure.
Figure 4:
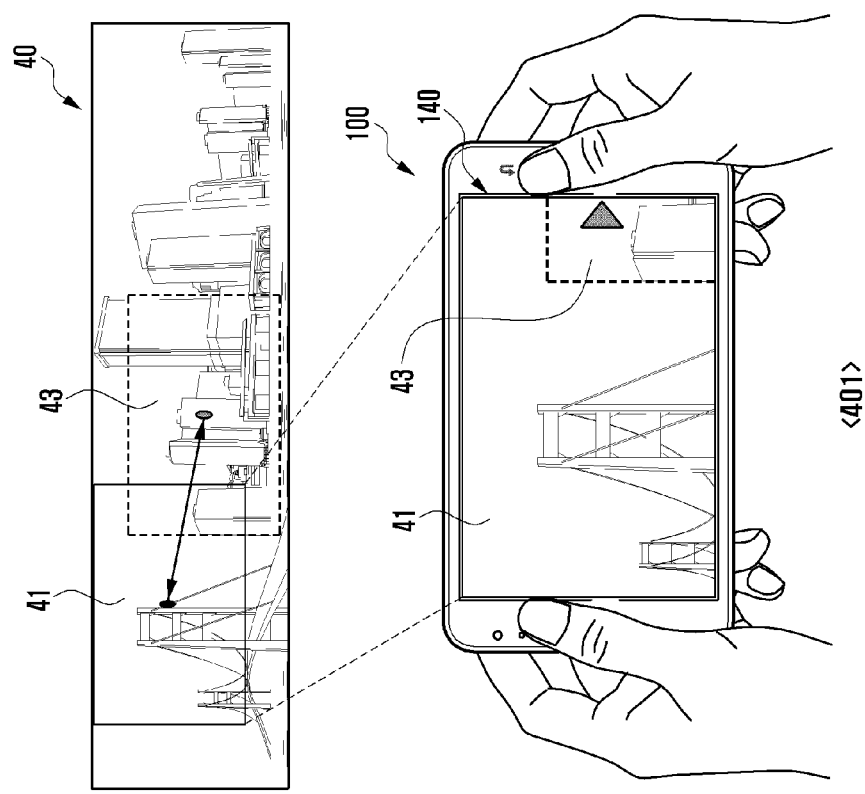

FIG. 4 illustrates an example of panorama image photography in supporting a camera operation according to an embodiment of the present disclosure.

Referring to FIG. 4, when photographing a real view 40 for a panorama image by using the terminal 100, a user may generate an input event for supplying an electric power to the camera unit 170 of the terminal 100. The terminal 100 may then supply the electric power to the camera unit 170 according to the generation of the input event, activates the camera unit 170. At this operation, the terminal 100 may identify settings for panorama image photography and for applying haptic-based guidance information, and then may perform a corresponding function. For example, if images are obtained for panorama image photography, the terminal 100 may calculate a view distance between a first panorama image 41 collected in a preview state and a second panorama image 43 corresponding to a virtual target image area to be photographed for synthesizing the panorama image, and provide a haptic feedback to guide the movement of camera unit 170 according to the calculated view distance. The panorama image photography function may be set to a panorama image photographing mode by a user interface or performed according to a dedicated panorama image application.

Because the panorama image photographing function may ask to obtain successive photographed images, a guide providing function for successive photographing may detect the current state of image photographing through context information detection after photographing and may store at least one image. Accordingly, the collecting of context information and providing of the panorama image for photography support may be performed after obtaining the first image.

The terminal 100 may output a user interface such as a preview screen and graphical user interface (GUI) for photography through the display unit 140. The haptic feedback is not required when obtaining the first image, and thereby the terminal 100 may set components for supporting the haptic feedback inactive and repeat an image input.

In detecting context information, user input and the current state of camera unit 170 can be detected. If an event such as pressing a photographing button is generated, the terminal 100 may identify the panorama image photography mode and process the context information after obtaining recognizable context information. Namely, in the context information processing, photographed images may be stored and the virtual target image area may be set corresponding to the second panorama image 43 to be photographed based on the first photographed image. The terminal 100 may display information of outlines and a direction indicator showing at least one of location, height, direction, bearings, or angle of the second panorama image 43 through the display unit 140. The terminal 100 may calculate relational information, such as vector information, distance between two images, angle difference, directional nature, overlapping, overlapping ratio of boundaries, overlapping ratio of areas, overlapping ratio of volumes, or length of overlapped boundaries in 2 or 3 dimensional coordinates, for haptic feedback from the first panorama image 41 as the current preview image of camera unit 170 to the virtual target image area corresponding to the second panorama image 43 is being obtained.

The virtual target image area may be obtained by an image comparison method considering an overlapping property between a previously stored image and a preview image currently received from the camera unit 170.

Alternatively, the virtual target image area may be obtained by estimating corresponding context information of the target image area to be photographed for synthesizing a panorama image based on context information of camera unit 170, such as a location, direction, angle, extent of movement, or rotation obtained through a GPS, gyro sensor, gyro compass, inclinometer, or accelerometer, while photographing is performed.

In setting a haptic feedback, the terminal 100 may set at least one of a type, an intensity, or a pattern of haptic feedback to be output by using calculated vector information, and output the haptic feedback accordingly. The output haptic feedback may vary according to the current location and viewpoint of camera unit 170, and distance to the virtual target image area to be photographed in sequence. For example, the feedback form may vary according to the distance between the center of panorama image 41 as a preview image currently collected by the camera unit 170 and the center of second panorama image 43 virtually calculated. A first haptic feedback provided according to a first distance between the center of the first panorama image 41 and the center of the second panorama image 43, as illustrated by Screen 401, is different from a second haptic feedback provided according to a second distance between the center of the first panorama image 41 and the center of the second panorama image 43, as illustrated by Screen 403.

For example, the first haptic feedback and second haptic feedback may be adjusted with different intensity or frequency of vibration according to the distance. If one haptic actuator is used as a drive motor, the intensity or frequency of vibration may be increased or decreased as the distance becomes greater. When a user changes the direction of terminal 100, the user may receive stronger or weaker tactile feedback as the center of second panorama image 43 approaches the center of first panorama image 41. Because the terminal 100 may photograph an image if the location of first panorama image 41 of preview image becomes identical to that of second panorama image 43, the tactile feedback may be designed to be gradually decreased and the vibration may stop when the locations of first and second panorama images become identical. At such point, the user can perform the panorama image photography function by pressing a shutter button and obtaining the second panorama image 43.

If the second panorama image 43 is obtained, the terminal 100 may calculate a virtual second panorama image based on the second panorama image 43, and provide haptic-based guide information in the same method as described above.

If the first image is photographed in the panorama image photographing, a contiguous image may be obtained by moving the terminal 100 in one of the upward, downward, rightward, or leftward directions.

Accordingly, after obtaining the first image, the terminal 100 may collect the movement direction of camera unit 170 through an acceleration sensor and calculate the location of second panorama image 43 based on the first image according to the movement direction.

Although FIG. 4 illustrates an example of moving the first panorama image 41 to the right for photographing the second panorama image 43, the calculation may be made in a similar way according to the movement of terminal 100, after photographing the first image, when the second panorama image 43 is disposed at the left, upper, or lower side.

Figure 5:
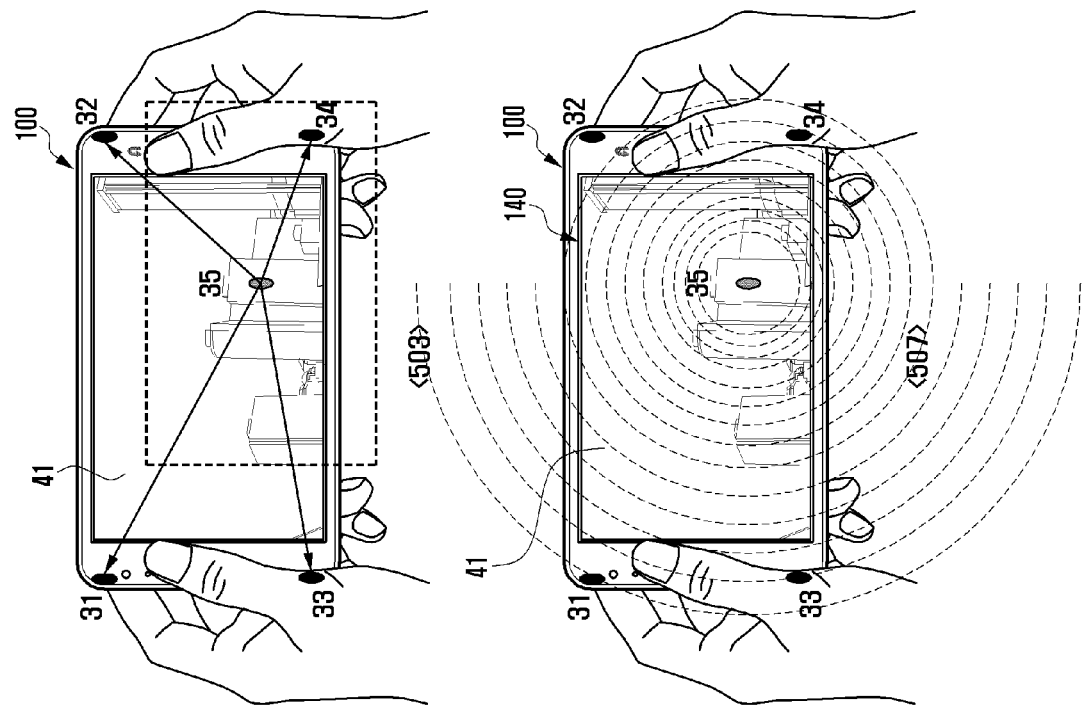
FIG. 5 illustrates another example of panorama image photographing in supporting a camera operation according to an embodiment of the present disclosure.
Figure 5:
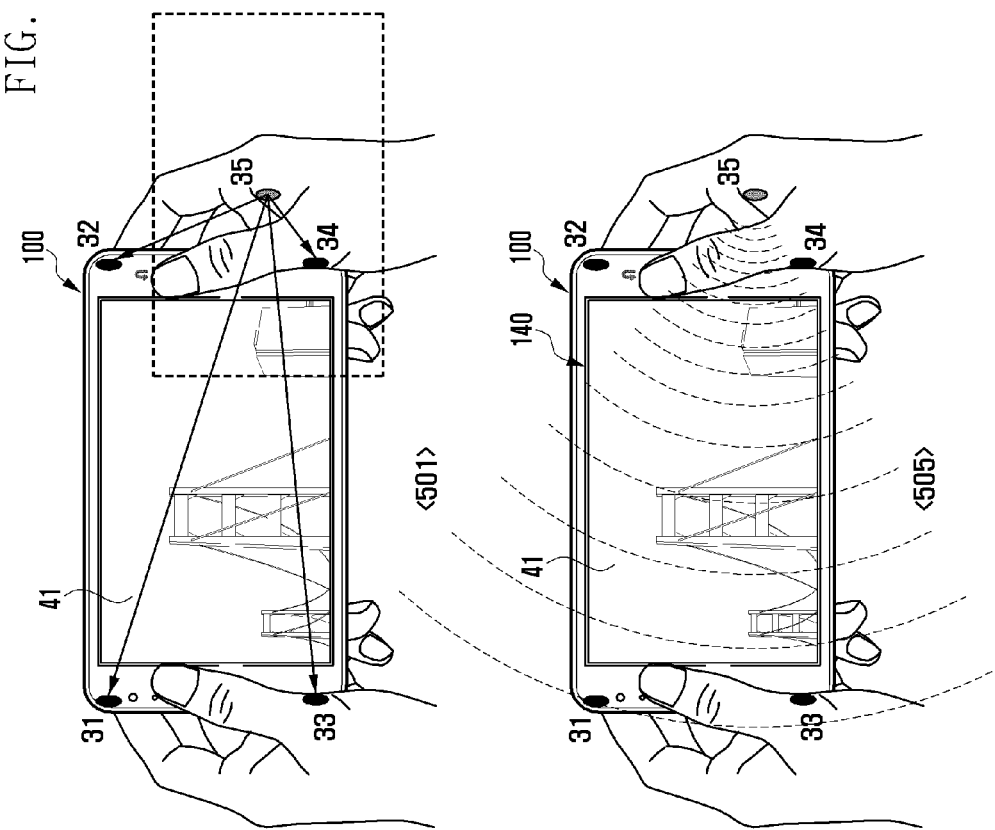

FIG. 5 illustrates another example of panorama image photography in supporting a camera operation according to an embodiment of the present disclosure.

Referring to FIG. 5, the haptic device module 180 of terminal 100 may include 4 haptic devices 31, 32, 33, and 34 for providing a haptic feedback. Accordingly, the terminal 100 can use the 4 haptic devices 31, 32, 33, and 34 to match the first panorama image 41 previewed by the camera unit 170 to the second panorama image 43. For example, if the center of second panorama image 35 is calculated, as illustrated by Screen 501, the terminal 100 may provide a haptic feedback corresponding to the distance between the center of second panorama image 35 and the center of first panorama image 41. Further, the terminal 100 may provide a corresponding haptic feedback, if the center of second panorama image 35 approaches the center of first panorama image 41, as illustrated by Screen 503. For example, in order to guide a user to move the terminal 100 to the lower right, the terminal 100 may generate a stronger vibration by using the 4 haptic device 31, 32, 33, and 34 as the center of first panorama image 41 approaches the center of second panorama image 35. In this case, all the 4 haptic devices 31, 32, 33, and 34 may not be necessary, and portions of the haptic devices 31, 32, 33, and 34 may be operated. Conversely, the terminal 100 may generate a weaker vibration as the center of first panorama image 41 approaches the center of second panorama image.

As another example of haptic feedback, the terminal 100 may indicate a directional nature by using a plurality of haptic devices 31, 32, 33, and 34. For example, the terminal 100 may provide haptic feedback in wave form by differentiating the drive order and intensity of vibration haptic devices 31, 32, 33, and 34 according to the distance between the center of the second panorama image 35 corresponding to the center of the virtual target image and the center of the first panorama image 41, as illustrated in Screens 505 and 507 screen. If an actuator is driven based on a predefined drive order and intensity of haptic devices 31, 32, 33, and 34, the terminal 100 may provide haptic feedback to the user in the form of a wave or directional nature of intensity. The terminal 100 may provide a stronger or higher frequency haptic feedback as the center of second panorama image 35 approaches the center of first panorama image 41 and a weaker or lower frequency haptic feedback as the center of second panorama image 35 grows apart from the center of first panorama image 41; otherwise, the intensity or frequency of haptic feedback may be controlled in the opposite way. Further, the haptic feedback can be provided by combining the intensity and frequency. In order to correctly provide the directional nature, the terminal 100 may control the remaining actuators to have a predetermined suspension period of operating once a specific actuator starts to operate.

In the description above, an example of using haptic devices 31, 32, 33, and 34 corresponding to 4 vibrating motors has been provided, however the haptic devices 31, 32, 33, and 34 may be installed with tiny actuators having an electrostatic, piezo-electric, or electro-magnetic device. For example, if the terminal 100 is provided with a touch interface, a more realistic haptic feedback in wave form can be provided by compactly disposing haptic actuators having touch and haptic functions in the display unit 140, and by driving the haptic actuator closest to the center of second panorama image 35 first and the remaining actuators in the order of distances.

The haptic actuators may be installed in the display unit 140 and also in the housing bezel of the terminal 100 and the sides or rear of the terminal 100. The haptic device module 180 having haptic actuators disposed in the terminal 100 may provide haptic feedback in 2-dimensional form and also in 3-dimensional form. If the haptic feedback is provided in the 3-dimensional form, the terminal 100 may design and provide haptic feedback with guidance information for planar movement or rotation, and also guidance information for 3-dimensional movements such as tilting, yawing, pitching, and rolling.

As described above, the terminal 100 may provide haptic feedback to the haptic actuators located at a surface contacted by a body such as a finger or palm or to those adjacent to the surface within a predetermined distance. For this, the terminal 100 may use a contact detection device for recognizing a contact of body, such as a mechanical detector, electromagnetic detector, pressure detector, piezoelectric detector, or electrostatic detector.

After outputting the haptic feedback, the terminal 100 may return to an image input operation and repeat the following operations. While detecting context information, the terminal 100 may control to automatically photograph and store a new image if it is determined that the center of second panorama image 35 becomes identical to the center of first panorama image 41 or if a predetermined condition or overlapping area is detected. In this situation, the terminal 100 would also set a new center of the second panorama image.

When the terminal 100 may not support automatic photographing, the terminal 100 may allow the user to manually photograph an image.

The above-described procedure may be repeated until all the images for generating a panorama image are photographed and synthesized.

In the context information detection, an operation of sensor setting may be added for separating context information to be collected according to an information processing mode from context information not to be collected. For example, a GPS or gyro compass would not generally be used if the setting of the virtual target image area corresponding to the second panorama image is performed by comparing a previous image and the current preview image, and thereby the terminal 100 does not filter the corresponding context information and may disable the corresponding sensors. Alternatively, the terminal 100 may activate one or more of an accelerometer or a gyro compass if they are to be utilized.

The information processing mode influences the processing of context information. For example, in photographing a panorama image, it is desirable to photograph a standstill object in order to avoid a blurred image caused by a movement of the subject or generation of afterimage. Therefore, the terminal 100 may provide a warning message through stronger haptic feedback or block the photographing, if a moving object is detected during the operation of collecting context information or a movement of the camera is greater than a predetermined threshold value.

When deciding on at least one of an intensity, a frequency, or a duration time of the haptic feedback, the terminal 100 may apply various methods besides the aforementioned method of deciding based on distance. For example, all of the following can be considered: the dimension of the second panorama image area currently displayed in the preview screen, ratios of outlines and boundaries, angle, and the volume of the second panorama image located in the display unit 140. As illustrated in screens 401 and 403, the second panorama image of screen 401 has relatively smaller values of area ratio and outline length ratio compared to the second panorama image of screen 403 when considering the total area of the second panorama image and the total outline length displayed in the display unit. According to one or more of the ratios, the intensity, the period, and the pattern of haptic feedback illustrated by screens 401 and 403 may be differently set. Similarly, the terminal 100 may differentiate the haptic feedback by considering an angle difference between the centers of first panorama images of Screens 401 and 403 and the center of second panorama image.

The terminal 100 may be designed to consider an outline length or ratio of the second panorama image, if it is desirable to photograph an image when all of the outlines of the second panorama image are included in the current preview screen of display unit 140 in a proper size, because a normal panorama image cannot normally be generated if the whole preview screen shows a portion of the second panorama image due to zooming in or the second panorama image is too small due to zooming out.

Alternatively, the terminal 100 may refrain from providing a haptic feedback even if the center of the first panorama image 41 is identical to the center of the second panorama image 35. If the center of the first panorama image 41 is not identical to the center of second panorama image 35, the terminal may provide haptic feedback in a specific pattern to inform of a lack of conformity of the two centers. Further, the terminal 100 may stop generating a haptic feedback in order to avoid generation of a blurred image in photographing.

Although a pattern and intensity of vibration are explained as examples of haptic feedback in the above description, the terminal 100 may also provide haptic feedback by using media such as a pulse, air pressure, or temperature. For this, the terminal 100 may adopt a haptic actuator configured with at least one of a motor, vibrator, mechanical actuator, electromechanical actuator, electromagnetic actuator, piezoelectric actuator, acoustic actuator, heat generator, cooler, pneumatic actuator, or microfluidic actuator.

Figure 6:
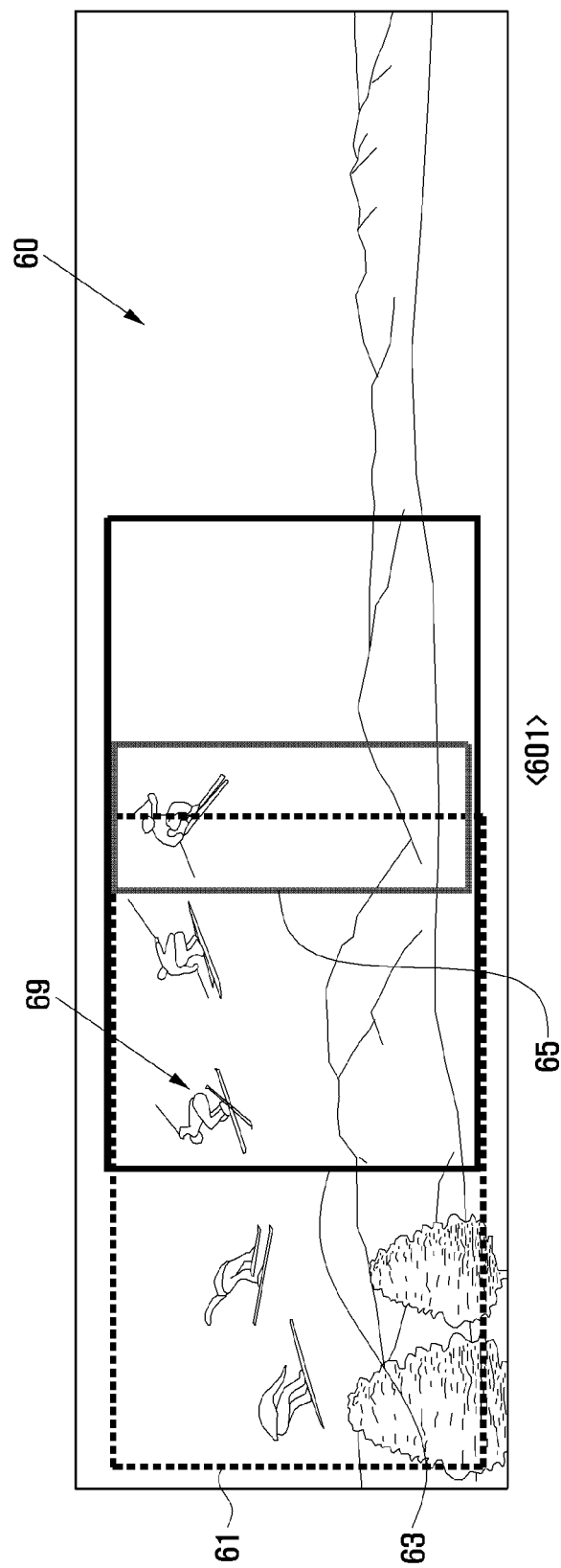
FIG. 6 illustrates an example of action shot image photographing in supporting a camera operation according to an embodiment of the present disclosure.

FIG. 6 illustrates an example of action shot image photography in supporting a camera operation according to an embodiment of the present disclosure.

Referring to FIG. 6, the terminal 100 may activate an action shot image photography mode if an input event for setting the action shot image photography mode or an input event for activating a dedicated application is generated. If the action shot image photography mode is set, the terminal 100 may detect the movement of object 69 in preview screen 61 of the whole real view 60 in a context information detecting operation. If the movement of object 69 in the preview screen 61 is detected, the terminal 100 may synthesize by adding section image 65 including the object 69 to the currently stored panorama image. The terminal 100 may operate so that the moving object 69 is located at the center of preview screen 61 or in the vicinity of the center by considering the movement direction of object 69. Accordingly, the terminal 100 may support the user in operating the camera based on haptic feedback provided.

Because the action shot image photographing mode may be activated after photographing and storing at least one image, the terminal 100 may detect the state of current image photographing through context information detection. If the photographing is not detected, the terminal 100 may output the preview screen 61 and a user interface such as a GUI for photography in the context information processing. Because the haptic feedback is not required in this situation, the terminal 100 may deactivate components related to the haptic feedback and repeat the image input operation.

In the context information detection, an input of user interface and the current state of the camera may be detected. For example, if an event of pressing a photography button is generated, the terminal 100 may set the action shot image photography mode to active, stores a photographed image in the context information processing, and sets a virtual area of action shot image 63 to be photographed. Here, the terminal 100 may store the preview images in a predetermined time period, identify a movement of object 69 by comparing the previously stored preview image and the current preview image, and set the virtual area of action shot image 63 by considering a movement direction, movement size, and location of the object 69.

The terminal 100 may output a haptic feedback after setting at least one of a type, an intensity, or a pattern of haptic feedback to be output by using the set virtual action shot image 63 and the calculated vector information. The haptic feedback for supporting the action shot image photography may be provided in a similar method as the panorama image photographing. However, if detecting a movement of object 69 is very important in the action shot image photography, the terminal 100 may provide haptic feedback having at least one of a proper pattern, a frequency, or an intensity by considering at least one of the speed, the angle, or the distance of the object 69, if the object moves fast and further away.

If the haptic feedback is output, the terminal 100 may return to the image input operation and repeat the following operations. In the context information detection, if the virtual area of the action shot image 63 and the current preview screen 61 are identical or if a predetermined condition or area overlapping is satisfied, the terminal 100 may automatically photograph and store a new action shot image, set a new virtual action shot image, and continue the action shot image photographing. The above procedure may be repeated until an action shot image is generated by photographing all the images for the action shot image to be photographed and synthesized.

The terminal 100 may include various additional modules, and may include components not described above, such as a Local Area Network (LAN) network communication module, an interface for data communication of the terminal 100 in a wired or wireless communication method, an Internet communication module performing an internet function by communicating with an internet network, and a digital broadcast module receiving and playing a digital broadcasting. All of the digital equipment may not be listed here because variation of the digital equipment is great according to the convergence trend; however components similar or equivalent to the aforementioned components may be additionally included. Further, the terminal 100 according to the present disclosure may exclude specific components or replace with other components. This will be apparent to those skilled in the related art.

Further, the terminal 100 may include all the mobile communication terminals operating by communication protocols corresponding to various communication systems, all the information and communication equipments, and multimedia equipments such as a Portable Multimedia Player (PMP), a digital broadcast player, a PDA, a music player (for example, MP3 player), a portable game terminal, a smart phone, a notebook, and a hand-held PC.

Although certain embodiments of the disclosure have been described in detail hereinabove, a person of ordinary skill in the art will understand and appreciate that many variations and modifications of the basic inventive concepts described herein will still fall within the spirit and scope of the disclosure as defined in the following claims and their equivalents.

What is claimed is:

1. A method for operating an electric device, the method comprising:
   receiving, by an electronic device including a camera, an input to activate the camera;
   receiving a request to output guidance information for assisting with photographing with the camera, wherein the guidance information includes information for facilitating with at least one of a panorama image photography mode and an action shot image photography mode;
   outputting haptic feedback corresponding to the guidance information, wherein the haptic feedback is determined based on whether a direction of movement of the electronic device corresponds to movement information provided by the guidance information;
   maintaining components related to the haptic feedback deactivated until a first image is acquired in the panorama image photography mode or the action shot image photography mode; and
   activating the components related to the haptic feedback when the first image is acquired.

2. The method of claim 1, wherein determining the haptic feedback comprises:
   calculating a virtual image area to be photographed in sequence based on a previously photographed image;
   calculating correlation information between a current preview area and the virtual image area; and
   determining the haptic feedback according to the correlation information.

3. The method of claim 2, wherein determining the haptic feedback comprises determining the haptic feedback such that the haptic feedback guides a user to move the camera so that the current preview area becomes identical to the virtual image area.

4. The method of claim 2, wherein the correlation information includes at least one of a distance between an image of the current preview area and the virtual image, angle difference, directional nature, overlapping nature, overlapping ratio of boundary line, overlapping ratio of area, overlapping area of volume, overlapped area, or length of overlapped boundary line.

5. The method of claim 2, wherein determining the haptic feedback determines a type or amplitude of haptic feedback according to the size of the correlation information.

6. The method of claim 1, wherein determining the haptic feedback comprises adjusting at least one of a strength, amplitude, intensity, frequency, duration, time, period, pattern, number of vibrations, temperature, air pressure, or electrostatics of the haptic feedback.

7. The method of claim 1, further comprising collecting context information including at least one of a terminal grip or contact location, camera location, camera state, angle, azimuth, rotation, service state, camera movement, object movement, GPS, geomagnetism, gyro compass, acceleration, angular velocity, horizontality, contact detection, expansion ratio, focusing information, motion recognition, or distance to object.

8. The method of claim 1, wherein determining the haptic feedback comprises adjusting at least one of a predefined strength, pattern, frequency, or drive order of a plurality of haptic devices.

9. The method of claim 7, wherein determining the haptic feedback comprises providing the haptic feedback including at least one of a terminal contact location obtained in the collection of context information, or an adjacent location within a predetermined distance from the terminal contact location.

10. The method of claim 1, wherein the guidance information further includes information for facilitating with at least one of a face recognition mode, an image-based barcode recognition mode, or a card recognition mode.

11. The method of claim 1, further comprising:
    selecting the panorama image photography mode;
    identifying whether motion information of a specific object is included in a preview image; and
    outputting a haptic feedback warning while temporarily stopping storing and synthesizing an image if the motion information is included.

12. The method of claim 1, further comprising:
    selecting the action shot image photography mode;
    identifying whether motion information of specific object is included in a preview image; and
    calculating an estimated motion of object and outputting a haptic feedback based on the calculation if the motion information is included.

13. An electronic device comprising:
    a camera configured to obtain an image; and
    a processor configured to determine haptic feedback corresponding to guidance information for assisting with photographing with the camera, if an output of the guidance information is requested, and to output the determined haptic feedback, wherein the haptic feedback is determined based on whether a direction of movement of the electronic device corresponds to movement information provided by the guidance information,
    wherein the processor maintains components related to the haptic feedback deactivated until a first image is acquired in a panorama image photography mode or an action shot image photography mode, and activates the components related to the haptic feedback when the first image is acquired.

14. The electronic device of claim 13, wherein the processor is further configured to:

calculate a virtual image area to be photographed in sequence based on a previously photographed image;

calculate correlation information between a current preview area and the virtual image area; and determine the haptic feedback according to the correlation information.

15. The electronic device of claim 14, wherein the processor determines the haptic feedback by instructing so that the current preview area becomes identical to the virtual image area.

16. The electronic device of claim 14, wherein the correlation information includes at least one of a distance between an image of the current preview area and the virtual image, angle difference, directional nature, overlapping nature, overlapping ratio of boundary line, overlapping ratio of area, overlapping area of volume, overlapped area, or length of overlapped boundary line.

17. The electronic device of claim 14, wherein the processor determines a type and amplitude of haptic feedback differently according to a size of the correlation information.

18. The electronic device of claim 13, further comprising a context information collecting module configured to collect information including at least one of a terminal grip or contact location, camera location, camera state, angle, azimuth, rotation, service state, camera movement, object movement, GPS, geomagnetism, gyro compass, acceleration, angular velocity, horizontality, contact detection, expansion ratio, focusing information, motion recognition, or distance to object.

19. The electronic device of claim 18, wherein the processor determines the haptic feedback by adjusting at least one of a predefined strength, pattern, frequency, or drive order of a plurality of haptic devices.

20. The electronic device of claim 18, wherein the processor controls to provide the haptic feedback including at least one of a terminal contact location obtained in the collecting context information, or an adjacent location within a predetermined distance from the terminal contact location.

21. The electronic device of claim 13, wherein the input unit is further configured to generate an input signal or a display unit having an input function to select at least one of a face recognition mode, an image-based barcode recognition mode, or a card recognition mode.

22. The electronic device of claim 13, wherein the processor temporarily stops storing and synthesizing an image, and outputs a haptic feedback warning, if motion information of a specific object is identified to be included in a preview image when the panorama image photography mode is selected.

23. The electronic device of claim 13, wherein the processor calculates an estimated motion of an object and controls to output haptic feedback warning based on the calculation, if motion information of a specific object is identified to be included in a preview image when the action shot image photographing mode is selected.

24. The electronic device of claim 13, wherein the haptic device module comprises at least one of a motor, vibrator, mechanical, electromechanical, electromagnetic, piezoelectric, acoustic generator, heat generator, cooler, pneumatic, or microfluidic haptic device.

25. The electronic device of claim 24, wherein the processor controls to output the determined haptic feedback by applying at least one of a strength of haptic, frequency, duration time, period, pattern, number of vibration, temperature, air pressure, or electrostatics of the haptic devices.

* * * * *